United States Patent
Winterowd et al.

(12)

(10) Patent No.: US 6,455,622 B1
(45) Date of Patent: Sep. 24, 2002

(54) COATING FOR WOOD BASED PANELS TO REDUCE CORROSION OF ATTACHED METALLIC MEMBER

(75) Inventors: Jack G. Winterowd, Puyallup, WA (US); Jerry D. Izan, Federal Way, WA (US); Charles E. Lewis, Federal Way, WA (US); Roger M. Shantz, Enumclaw, WA (US)

(73) Assignee: Weyerhaeuser, Federal Way, WA (US)

( * ) Notice: Subject to any disclaimer, the term of this patent is extended or adjusted under 35 U.S.C. 154(b) by 0 days.

(21) Appl. No.: 09/704,511

(22) Filed: Nov. 1, 2000

Related U.S. Application Data

(63) Continuation of application No. PCT/US99/09828, filed on May 4, 1999.
(60) Provisional application No. 60/084,310, filed on May 5, 1998.

(51) Int. Cl.[7] .................................................. C08K 3/38
(52) U.S. Cl. ........................................ 524/405; 524/436
(58) Field of Search .................................. 524/405, 436

(56) References Cited

U.S. PATENT DOCUMENTS

| 4,372,814 | A | | 2/1983 | Johnstone et al. | |
|---|---|---|---|---|---|
| 4,487,657 | A | | 12/1984 | Gomez | |
| 5,993,534 | A | * | 11/1999 | Winterowd et al. | ......... 106/461 |

* cited by examiner

Primary Examiner—Edward J. Cain
(74) Attorney, Agent, or Firm—Christensen, O'Connor, Johnson & Kindness

(57) ABSTRACT

An anticorrosion formulation for coating wood based panels to inhibit the corrosion of metallic members in contact with the panel is disclosed. In one embodiment, the formulation includes water, a binding agent, boric acid, and a group II metal hydroxide selected from beryllium hydroxide, magnesium hydroxide, calcium hydroxide, strontium hydroxide, and barium hydroxide. A wood-based panel coated with the anticorrosion formulation and a method for forming the coated panel are provided.

25 Claims, No Drawings

COATING FOR WOOD BASED PANELS TO REDUCE CORROSION OF ATTACHED METALLIC MEMBER

CROSS-REFERENCE TO RELATED APPLICATIONS

This application is a continuation of copending International Application No. PCT/US99/09828, filed May 4, 1999, which claims the benefit of U.S. Patent Application No. 60/084,310, filed May 5, 1998. The benefit of the priority of the filing dates of each is hereby claimed under 35 U.S.C. §§120 and 119, respectively. Each of the above-identified applications is incorporated herein by reference in its entirety.

FIELD OF THE INVENTION

The present invention relates to a coating for wood panels to reduce corrosion of metallic members attached thereto.

BACKGROUND OF THE INVENTION

Oriented strandboard (OSB) panels are commonly used as wall sheathing in the construction of residential homes. These panels are attached directly onto the framing members of a house. Traditionally, the framing members have been wood studs. It is recognized in the construction industry that OSB wall sheathing panels, which are typically 7/16" thick and 4'×8' in length can be attached to wood studs by use of nails or screws without concern of any negative interaction between the contacting building materials.

Due to a general decline in the quality of wood studs and erratic prices over the last decade, steel studs have become substantially more common in residential home construction. While steel studs are generally more expensive than wood studs, they have the advantage of being more geometrically perfect, more stable with respect to relative humidity changes, and more consistent from stud to stud. In contrast, builders must sort through shipments of wood studs and separate the straight studs from the warped, bowed and twisted studs.

Steel studs are galvanized in order to make them more corrosion resistant. In the galvanizing process a thin layer of zinc is deposited on the outer surface of the steel studs. This outer layer of zinc is more easily oxidized than the steel. Thus, the zinc layer becomes sacrificial in harsh, oxidative, wet environments where steel is likely to corrode.

As steel studs became more commonly used, it was discovered that they were corroding at an unusually rapid rate when OSB wall sheathing was attached to them. The majority of the corrosion has been found to occur at the sheathing-to-stud contact points. In fact, corroded steel studs often have a visible corrosion pattern that mirrors the pattern of the surface strands in the contacting OSB.

An accelerated corrosion test has been used in North America and Japan to evaluate the rate of corrosion of steel studs that are attached to wood sheathing panels. In this test sections of wood sheathing are tightly screwed to sections of galvanized steel studs and the assemblies are stored in chambers at a temperature of 50° C. and a relative humidity of 95% for approximately 800 hours. Plywood sheathing has been associated with minimal corrosion in this test, but significant corrosion has been observed when OSB sheathing has been used. In almost all cases this corrosion is manifest as brown colored, strand-shaped stains that seem to penetrate into the stud surface. A white residue, which is believed to be zinc oxide, is also commonly observed. In the most severe cases red and black deposits, which are believed to be corrosion products of iron, are also present on the stud surface.

The mechanism of the corrosive action is not clearly understood. We have theorized that some unique extractive (s) in the OSB is corroding the steel surface.

We have developed a formulation which can be applied as a coating to the contacting surface of the OSB wall sheathing during the panel manufacturing process. This coating effectively prevents the OSB wall sheathing from corroding steel studs.

SUMMARY OF THE INVENTION

In one aspect, the present invention provides an anticorrosion formulation for coating wood based panels to inhibit the corrosion of metallic members in contact with the panel. The formulation is an aqueous formulation that includes boric acid and a group II metal hydroxide selected from beryllium hydroxide, magnesium hydroxide, calcium hydroxide, strontium hydroxide, and barium hydroxide. In one embodiment, the formulation includes a binding agent, preferably carboxylated styrene-butadiene latex.

In another aspect of the invention, a wood based panel coated with the anticorrosion formulation and a method for forming the coated panel is provided.

DETAILED DESCRIPTION OF THE PREFERRED EMBODIMENT

The invention includes an anticorrosion formulation, a method of applying said formulation to OSB sheathing panels, and the resulting treated OSB sheathing panel which does not corrode steel studs.

Anti-Corrosion Formulation

The formulation includes water, a binding agent, boric acid and a group II metal hydroxide. Other useful constituents of the formulation include surfactants, colorants, viscosifying agents, diluents, antifoaming agents or any other additive which facilitates the application of the boric acid and group II metal hydroxide.

The amount of boric acid applied to the OSB through the coating formulation should be in the range of 0.05 moles/$m^2$ to 1.0 moles/$m^2$.

Examples of the group II metal hydroxide include beryllium hydroxide, magnesium hydroxide, calcium hydroxide, strontium hydroxide, and barium hydroxide. The amount of metal hydroxide applied to the OSB through the coating formulation should be in the range of 0.05 moles/$m^2$ to 1.0 moles/$m^2$.

The molar ratio of boric acid to group II metal hydroxide should be in the range of 1:10 to 10:1.

The coating formulation can be applied to the panel surface by any suitable method including brushing, spraying, and roll coating.

In addition to their use as wall sheathing, the coated panels of the present invention can also be used as a roofing material.

EXAMPLE 1

An anticorrosion formulation was prepared by sequentially combining water (633 parts by weight), a carboxylated styrene-butadiene latex known as Tylac 97422 (Reichhold Chemicals, Inc., Dover, Del.) (193 parts by weight), magnesium hydroxide powder (50 parts by weight), and boric acid (124 parts by weight) with stirring until the mixture was homogenized. This anti-corrosion formulation was applied to a sheet of OSB wall sheathing (Weyerhaeuser Company, Drayton Valley, AB, Canada) by use of a brush at a spread rate of 30 g/m². The coating on the panel dried while the panel was conditioned at a temperature of 20° C. and a relative humidity of 50% for a period of 24 hours. This coated OSB sheathing panel was subjected to the standard steel stud corrosion test (described previously) with the applied coating positioned between the OSB and the stud. No corrosion was observed on the steel stud after 800 hours of contact with the coated OSB.

EXAMPLE 2

An anti-corrosion formulation was prepared by sequentially combining water (504 parts by weight), a carboxylated styrene-butadiene latex known as Tylac 97422 (Reichhold Chemicals, Inc., Dover, Del.) (250 parts by weight), strontium hydroxide powder (122 parts by weight), and boric acid (124 parts by weight) with stirring until the mixture was homogenized. This anti-corrosion formulation was applied to a sheet of OSB wall sheathing (Weyerhaeuser Company; Drayton Valley, AB, Canada) by use of a brush at a spread rate of 60 g/m². The coating on the panel dried while the panel was conditioned at a temperature of 20° C. and a relative humidity of 50% for a period of 24 hours. This coated OSB sheathing panel was subjected to the standard steel stud corrosion test (described previously) with the applied coating positioned between the OSB and stud. Minimal corrosion was observed on the steel stud after 800 hours of contact with the coated OSB.

One liability of the formulations previously described pertains to their shelf lives. The group II metal hydroxides react with boric acid in aqueous media to form insoluble metal borates. Over the course of several hours or even days the size of the metal borate crystals becomes sufficiently large for them to settle. This problem can be overcome by spraying on two formulations to the OSB. One of the formulations must contain boric acid and the other formulation must contain a group II metal hydroxide. Again, the amount of boric acid applied to the OSB must be in the range of 0.05 moles/m² to 1.0 moles/m². Also, the amount of group II metal hydroxide applied to the OSB must be in the range of 0.05 moles/m² to 1.0 moles/m².

EXAMPLE 3

Two different formulations were prepared.

Boric Acid Formulation. Water (586 parts by weight) was combined with a carboxylated styrene-butadiene latex known as Tylac 97422 (Reichhold Chemicals, Inc., Dover, Del.) (250 parts by weight), titanium dioxide powder (40 parts by weight) and boric acid (124 parts by weight) with stirring until the mixture was homogenized.

Magnesium Hydroxide Formulation. Water (593 parts by weight) was combined with a carboxylated styrene-butadiene latex known as Tylac 97422 (Reichhold Chemicals, Inc., Dover, Del.) (250 parts by weight), titanium dioxide powder (40 parts by weight) and magnesium hydroxide powder (117 parts by weight) with stirring until the mixtures was homogenized.

The boric acid formulation was sprayed onto a section of OSB wall sheathing (Weyerhaeuser Company, Drayton Valley, AB, Canada) at a spread rate of 50 g/m². The magnesium hydroxide formulation was then sprayed directly on top of the boric acid formulation coating at a spread rate of 50 g/m². The resulting bilayer coating dried while the sample was conditioned at a temperature of 90° C. and a relative humidity of 5% for 2 minutes.

EXAMPLE 4

Two different formulations were prepared.

Boric Acid Formulation. Water (175 parts by weight) was combined with a viscosity-increasing agent, known as Avicel RCN-30 (FMC Corp.; Philadelphia, Pa.) (18.0 parts by weight) under high shear in a 180 gallon blender for 30 minutes. A carboxylated styrene-butadiene latex, known as Tylac 97422 -20 (Reichhold Chemicals, Inc.; Dover, Del.) (457.0 parts by weight); poly(propylene glycol), known as Pluracol P1010 (BASF Corp.; Mount Olive, N.J.) (20.0 parts by weight); titanium dioxide, known as Tronox CR-822 (Kerr-McGee Chemical Corp.; Oklahoma City, Okla.) (30.0 parts by weight); powdered boric acid (U.S. Borax, Inc.; Valencia, Calif.) (240.0 parts by weight); powdered anhydrous calcium sulfate, known as Snow White Filler (United States Gypsum Co.; Chicago, Ill.) (50.0 parts by weight); and a porous precipitated silica powder, known as Cab-O-Sil EH-5 (Cabot Corp.; Tuscola, Ill.) (10.0 parts by weight) were then added to the blending vessel, sequentially, with high shear blending subsequent to each addition. The formulation was homogenous and stable at a temperature of 20° C. for at least two months.

Magnesium Hydroxide Formulation. Water (167 parts by weight) was combined with a viscosity-increasing agent, known as Avicel RCN-30 (FMC Corp.; Philadelphia, Pa.) (18.0 parts by weight) under high shear in a 180 gallon blender for 30 minutes. A carboxylated styrene-butadiene latex, known as Tylac 97422 -20 (Reichhold Chemicals, Inc.; Dover, Del.) (457.0 parts by weight); poly(propylene glycol), known as Pluracol P1010 (BASF Corp.; Mount Olive, N.J.) (30.0 parts by weight); titanium dioxide, known as Tronox CR-822 (Kerr-McGee Chemical Corp.; Oklahoma City, Okla.) (30.0 parts by weight); powdered magnesium hydroxide (Martin-Marietta Magnesia Specialties; Baltimore, Md.) (100.0 parts by weight); powdered anhydrous calcium sulfate, known as Snow White Filler (United States Gypsum Co.; Chicago, Ill.) (188.0 parts by weight); and a porous precipitated silica powder, known as Cab-O-Sil EH-5 (Cabol Corp.; Tuscola, Ill.) (10.0 parts by weight) were then added to the lending vessel, sequentially, with high shear blending subsequent to each addition. The formulation was homogenous and stable at a temperature of 20° C. for at least two months.

The boring acid formulation was combined with the magnesium hydroxide formulation at 1:1 volumetric ratio. The mixture was homogenized and immediately applied to the top major surface of OSB panels (6'×4'×12 mm) at a total wet spread rate of 10–12 g/ft² by use of a series of three roll coating machines. The coated panels were dried by transporting them through a series of drying ovens. The dry panels were then stacked, packaged and transported to a construction site where they were used in conjunction with steal framing members. Independent tests conducted on the panels demonstrated that the coated, major face had no propensity to corrode the steal framing members.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A formulation comprising water, a binding agent, boric acid, and a group II metal hydroxide selected from the group consisting of beryllium hydroxide, magnesium hydroxide, calcium hydroxide, strontium hydroxide, barium hydroxide, and mixtures thereof, wherein the molar ratio of boric acid to metal hydroxide in the formulation is in the range from about 1:10 to about 10:1.

2. The formulation of claim 1 wherein the binding agent comprises carboxylated styrene-butadiene latex.

3. A formulation comprising water, boric acid, magnesium hydroxide, and carboxylated styrene-butadiene latex, wherein the molar ratio of boric acid to magnesium hydroxide in the formulation is in the range from about 1:10 to about 10:1.

4. A wood panel coated with a formulation comprising water, a binding agent, boric acid, and a group II metal hydroxide selected from the group consisting of beryllium hydroxide, magnesium hydroxide, calcium hydroxide, strontium hydroxide, barium hydroxide, and mixtures thereof, wherein the metal hydroxide is present on the panel in an amount from about 0.05 to about 1.0 moles/m$^2$, and wherein boric acid is present on the panel in an amount from about 0.05 to about 1.0 moles/m$^2$.

5. The panel of claim 4 wherein the panel comprises a sheet of oriented strand board.

6. The panel of claim 4 wherein the binding agent comprises carboxylated styrene-butadiene latex.

7. A wood panel sequentially coated with a boric acid formulation and a group II metal hydroxide formulation, wherein the boric acid formulation is applied to the panel's surface, wherein the metal hydroxide formulation is applied to the applied boric acid formulation, wherein the boric acid formulation comprises water, boric acid, and a binding agent, wherein the metal hydroxide formulation comprises water, a binding agent, and a metal hydroxide selected from the group consisting of beryllium hydroxide, magnesium hydroxide, calcium hydroxide, strontium hydroxide, barium hydroxide, and mixtures thereof, wherein the metal hydroxide is present on the panel in an amount from about 0.05 to about 1.0 moles/m$^2$, and wherein boric acid is present on the panel in an amount from about 0.05 to about 1.0 moles/m$^2$.

8. The panel of claim 7 wherein the binding agent comprises carboxylated styrene-butadiene latex.

9. The panel of claim 7 wherein the panel comprises a sheet of oriented strand board.

10. A method for inhibiting the corrosion of a steel stud contacting a wood panel, comprising:
applying an anticorrosive formulation to the panel in the region in contact with the steel stud, wherein the formulation comprises water, a binding agent, boric acid, and a group II metal hydroxide selected from the group consisting of beryllium hydroxide, magnesium hydroxide, calcium hydroxide, strontium hydroxide, barium hydroxide, and mixtures thereof, wherein the metal hydroxide is present on the panel in an amount from about 0.05 to about 1.0 moles/m$^2$, and wherein boric acid is present on the panel in an amount from about 0.05 to about 1.0 moles/m$^2$.

11. The method of claim 10 wherein the binding agent comprises carboxylated styrene-butadiene latex.

12. The method of claim 10 wherein the panel comprises a sheet of oriented strand board.

13. A method for inhibiting the corrosion of a steel stud contacting a wood panel, comprising:
applying a boric acid formulation to the panel in the region in contact with the steel stud to provide a boric acid-treated panel, wherein the boric acid formulation comprises water, boric acid, and a binding agent, and wherein boric acid is present on the panel in an amount from about 0.05 to about 1.0 moles/m$^2$; and applying a metal hydroxide formulation to the boric acid-treated panel, wherein the metal hydroxide formulation comprises water, a binding agent, and a metal hydroxide selected from the group consisting of beryllium hydroxide, magnesium hydroxide, calcium hydroxide, strontium hydroxide, barium hydroxide, and mixtures thereof, and wherein the metal hydroxide is present on the panel in an amount from about 0.05 to about 1.0 moles/m$^2$.

14. The method of claim 13 wherein the binding agent comprises carboxylated styrene-butadiene latex.

15. The method of claim 13 wherein the panel comprises a sheet of oriented strand board.

16. A method for forming a coated wood panel that is resistant toward corrosion of a metallic member in contact therewith, comprising:
applying an anticorrosion formulation to the surface of a wood-based panel, wherein the formulation comprises water, a binding agent, boric acid, and a group II metal hydroxide selected from the group consisting of beryllium hydroxide, magnesium hydroxide, calcium hydroxide, strontium hydroxide, barium hydroxide, and mixtures thereof;
drying the applied formulation to provide a coated wood-based panel, wherein the panel comprises boric acid in an amount from about 0.05 to about 1.0 moles/m$^2$, and metal hydroxide in an amount from about 0.05 to about 1.0 moles/m$^2$.

17. The method of claim 16 wherein wood-based panel comprises a sheet of oriented strand board.

18. The method of claim 16 wherein applying the formulation comprises brushing the formulation onto the panel.

19. The method of claim 16 wherein applying the formulation comprises spraying the formulation onto the panel.

20. The method of claim 16 wherein applying the formulation comprises roll coating the formulation onto the panel.

21. A method for forming a coated wood panel that is resistant toward corrosion of a metallic member in contact therewith, comprising:
applying a boric acid formulation to a surface of a wood-based panel to provide a boric acid-coated panel, wherein the formulation comprises water, boric acid, and a binding agent;
applying a metal hydroxide formulation to the boric-acid coated panel, wherein the formulation comprises water, a binding agent, and a metal hydroxide selected from the group consisting of beryllium hydroxide, magnesium hydroxide, calcium hydroxide, strontium hydroxide, barium hydroxide, and mixtures thereof; and
drying the applied formulations to provide a coated wood-based panel, wherein the panel comprises boric acid in an amount from about 0.05 to about 1.0 moles/m$^2$, and metal hydroxide in an amount from about 0.05 to about 1.0 moles/m$^2$.

22. The method of claim 21 wherein wood-based panel comprises a sheet of oriented strand board.

23. The method of claim 21 wherein applying the formulation comprises brushing the formulation onto the panel.

24. The method of claim 21 wherein applying the formulation comprises spraying the formulation onto the panel.

25. The method of claim 21 wherein applying the formulation comprises roll coating the formulation onto the panel.

* * * * *